United States Patent
Casey et al.

(10) Patent No.: US 8,315,255 B1
(45) Date of Patent: Nov. 20, 2012

(54) PSUEDO WIRE MERGE FOR IPTV

(75) Inventors: Liam Casey, Ottawa (CA); David Allan, Ottawa (CA)

(73) Assignee: Rockstar Consortium US LP, New York, NY (US)

( * ) Notice: Subject to any disclaimer, the term of this patent is extended or adjusted under 35 U.S.C. 154(b) by 1008 days.

(21) Appl. No.: 11/262,664

(22) Filed: Oct. 31, 2005

Related U.S. Application Data

(60) Provisional application No. 60/630,445, filed on Nov. 23, 2004.

(51) Int. Cl.
*H04L 12/28* (2006.01)
(52) U.S. Cl. .................................. 370/389; 711/201
(58) Field of Classification Search .................. 370/389; 711/201
See application file for complete search history.

(56) References Cited

U.S. PATENT DOCUMENTS

| | | | |
|---|---|---|---|
| 6,985,488 B2 * | 1/2006 | Pan et al. | 370/395.3 |
| 2002/0037006 A1 * | 3/2002 | Sampath et al. | 370/389 |
| 2004/0156313 A1 * | 8/2004 | Hofmeister et al. | 370/229 |
| 2005/0068933 A1 * | 3/2005 | Kokkonen et al. | 370/349 |

* cited by examiner

*Primary Examiner* — Robert Wilson
*Assistant Examiner* — Wei Zhao
(74) *Attorney, Agent, or Firm* — Anderson Gorecki & Rouille LLP

(57) ABSTRACT

The downstream IP packets of uni-cast services, such as Internet Access or Voice over IP network, are transported over the pseudo wire from service provider nodes at the metro hub to the access edge, whereupon they are converted to be transported on the first mile technology, such as a DSL loop, that serves the subscriber's residence. A television service provider delivers the collection of television channels through the regional network to an intermediate node, herein called the metro edge device. The function of the metro edge for downstream uni-cast traffic is to de-multiplex the downstream pseudo-wires coming on packet trunks from metro hubs, into a greater number of packet trunks leading to access edges. In this invention the metro edge device is operable to unicast individual selected channels to the subscriber's residence by adding copies of the IP packets of the selected channels into the downstream flow of packets in the subscriber's pseudo wire.

15 Claims, 4 Drawing Sheets

PSUEDO WIRE MERGE FOR IPTV

CROSS-REFERENCE TO RELATED APPLICATIONS

A claim of priority is made to U.S. Provisional Patent Application 60/630,445, entitled PSEUDO WIRE MERGE, filed Nov. 23, 2004, which is incorporated by reference.

FIELD OF THE INVENTION

This invention relates generally to the field of network communications, and more particularly to the delivery of television and related video services over residential broadband networks.

BACKGROUND OF THE INVENTION

Two commonly deployed technologies for delivering television service are cable and satellite. Cable television typically utilizes a coaxial cable as the physical medium on which television signals are broadcast. Individual television channels can be selected for viewing via a set-top box or "cable-ready" television. Satellite television utilizes satellite dishes which are aligned with satellites to receive wireless broadcast signals. Like cable, individual television channels are selected via a set-top box. Because of the relatively high cost of deploying cable and satellite infrastructure, the barriers to entry for potential competing television service providers are high.

An infrastructure which already exists and has potential for delivery of television services is the telephone network. For example, it has been proposed to provide television service via Digital Subscriber Line ("DSL") technology. However, DSL lacks the bandwidth necessary to broadcast hundreds of television channels simultaneously to a set-top box on a local loop. It has been proposed to only transmit the individual currently selected television channels to subscribers so as to operate within the bandwidth available on the local loop. This approach is sometimes called Switched Digital Broadcast because the user controls a switch in the network that selects from all television channels the channel (or potentially 2 or 3 channels) that are delivered on the DSL loop to the residence. Switched Digital Broadcast requires that the delivery network support a control protocol to signal the user's choice of television channel to be delivered to his/her set-top box (the channel change protocol ("CCP")) and a data plane mechanism for replicating the data streams that are the selected television channels onto every set-top box that has selected them. It has been commonly proposed for DSL delivered SDB transport that each TV channel is a distinct Internet Protocol ("IP") multicast group (i.e. with its own IP multicast address) and then to use a version of the Internet Group Management Protocol ("IGMP") as the CCP, and matching this to use ("IP") multicast routers for replicating data streams, following the rules of IP multicast forwarding. However, this solution requires IGMP snooping capability in all WLAN and Ethernet switches in the residence up to the channel change point. It also requires that the access network implement full IP protocol stacks and is dependent on whether IP version 4 (IPv4) or IP version 6 (IPv6) is in use (for IPv6 deployments the Multicast Listener Discovery ("MLD") Protocol replaces IGMP). Further, since the CCP is an in-band control protocol it fails to provide support for a policy server to block or modify channel selections.

Some of the short comings described above were addressed in the ISO/IEC standard 13818-6 Digital Storage Media-Command and Control (DSM-CC), which defined a CCP specifically for SDB. The DSM-CC SDB CCP is a application level protocol between a client (such as a set-top box) and an SDB Server. The SDB server is not required to be the network element that replicates the television channel data streams, so there is the opportunity for the network to apply per subscriber policies to channel change operations. Further, the SDB-CCP protocol allows the set-top box to be provided with characteristics of the newly chosen channel, such as the codec used in its encoding and any conditional access encryption keys needed to de-encrypt the content. However, one shortcoming of the DSM-CC SDB model is that it assumes that the television stream is delivered over ATM as the layer 2 protocol, and in its own virtual circuit connection ("VCC"). While the usual layer 2 protocol for DSL and metropolitan networks that serve the DSLAMs that drive the DSL loops has been ATM, the usual mode of operation is to use a single VCC per DSL loop. Hence, this single VCC would have to carry all broadband traffic, both point-to-point and broadcast.

U.S. Pat. No. 6,788,696 describes a VC merge mechanism whereby the chosen channel contents can be merged into the point-to-point VCC so that all content going to the residence appears at the DSLAM and on the DSL loop as a single VCC. This single VCC model of operation works best when there is only a single device at the end of the DSL loop, which is not the situation with the so-called "triple play." With "triple-play" the intention is to deliver Internet access, multimedia telephony and television services to multiple devices in the home. The home requires a network to connect these devices to the DSL loop termination point and this network is most often an Ethernet compatible network (i.e. Ethernet itself, Wireless LAN or something like phone net). Further, network operators have signaled a desire to move away from ATM as the layer 2 protocol in their metropolitan aggregation networks and use Ethernet technology instead. Ethernet in itself is a connectionless layer 2 protocol and there have been several standards efforts initiated to replicate the virtual circuit mechanism when the underlying transport mechanism is not ATM. In effect, the goal is to replace ATM VCCs with Ethernet pseudo wires. Ethernet pseudo wires are realized by pre-pending customer Ethernet packets with a virtual circuit label and then encapsulating the result in to some (service) provider packet transport frame. When the virtual circuit label is an MPLS label and the provider packet transport is MPLS this encapsulation is often called "Martini encapsulation" after the author of the first Internet Draft document that described it. The IETF working group that originated the term "pseudo wire" has so far considered only two types of provider packet transport: MPLS and IP. However it has been noted in another Internet Draft, called "Dry Martini," that pseudo wires do not depend on the label being an MPLS format label, nor on the provider packet transport protocol being MPLS or IP. Although not explicitly labeled as a being a pseudo wire realization, the MAC in MAC protocol, or, as it is now called, Provider Backbone Bridging (PBB) being standardized by the IEEE 802.3ah group is a form of pseudo wire: the label field is a the Service Tag and the provider packet transport is Ethernet. The original intent of pseudo wires is that they behave just as a real wire would in terms of transporting customers packets, i.e., a pseudo wire provides a point-to-point connection service where packets accepted at one end are delivered unchanged, and in the same order, at the other end. Thus to deliver both unicast and broadcast traffic to a DSL loop over a single pseudo-wire would require that both types of traffic be merged together as a single Ethernet packet stream before the (downstream) ingress point of the pseudo wire. Typically this ingress point is deep inside the metropolitan aggregation network and in some deployments it is actually in another metropolitan network altogether. This is problematic because performing the switching function, replicating broadcast packets, at the PE end point would be very inefficient as perhaps 10 s of thousands of copies of the same TV channel stream of packets would have to be transported over the same network link.

SUMMARY OF THE INVENTION

In accordance with the invention, a method for delivering two streams of packets comprises the steps of: forwarding at an intermediate node in a network a first stream of a packets within a pseudo wire, the pseudo wire being used to transmit packets of this first stream from an ingress node to a an egress node; receiving or generating at the intermediate node a second stream of packets that are not within the pseudo wire; modifying the headers of the second stream of packets in such manner that downstream nodes will forward the packets in identical fashion to those of the first stream within the pseudo wire; and transmitting towards the egress node the modified packets, merged in with the original pseudo wire packets.

In one embodiment of the invention a method for delivering a switched digital broadcast television service, or any form of organized broadcast content, where streams of content are delivered in channels, to a receiver device, a decoder, in a subscriber's residence comprises the steps of: receiving available television broadcast channels from their sources, each broadcast channels being transmitted as multicast packets with the destination multicast address of the packets identifying the channel; copying and merging selected ones of the received multicast packets which contain data of a particular television channel into a pseudo wire; and unicast-transmitting the selected packets via the pseudo-wire to a decoder at the subscriber's residence. In terms of a network architecture for delivering a television service to a subscriber's residence from a source, one embodiment of the invention includes a metro edge device operable to receive a television broadcast from the source, the broadcast having multiple channels which are transmitted in multicast addressed packets, the metro edge device being further operable to merge selected ones of the received multicast packets which contain data of a particular television channel into a pseudo-wire, and unicast-transmit the selected packets via the pseudo-wire to a decoder at the subscriber's residence.

In another embodiment of the invention merging includes swapping fields in a header portion of the selected ones of the received multicast packets. In particular when the multicast packets are Ethernet packets, the multicast destination MAC address of the received multicast packet is swapped for a pseudo-wire label and unicast destination MAC address of the unicast-transmitted packet, where the pseudo-wire label is specific to the subscriber's residence and the unicast destination MAC address is the address of the decoder. Signaling from the decoder may also prompt selecting different ones of the received multicast packets which contain data of a newly selected television channel for merging into the pseudo wire, e.g., signaling an indication of the multicast destination MAC address associated with the newly selected channel.

The invention described herein allows, among other things, the choice of channel change point i.e., where multicast is converted to unicast, to be decoupled from where the pseudo wire is terminated, so that it can be performed at the optimum spot that minimizes the total number of broadcast TV packets carried. Moving the channel change point away from the television signal source enables more efficient use of bandwidth in regional and Inter-Office Fibre networks. Moving the channel change point away from the decoder mitigates the bandwidth requirement of the access network. Further, it offers the potential for enhanced security and support of a policy server. Application server and control functions advantageously enable the channel change point to be at a metro edge device which typically would not be capable of supporting the security and policy aspects of channel changing and other control operations.

DETAILED DESCRIPTION

Figure 1:
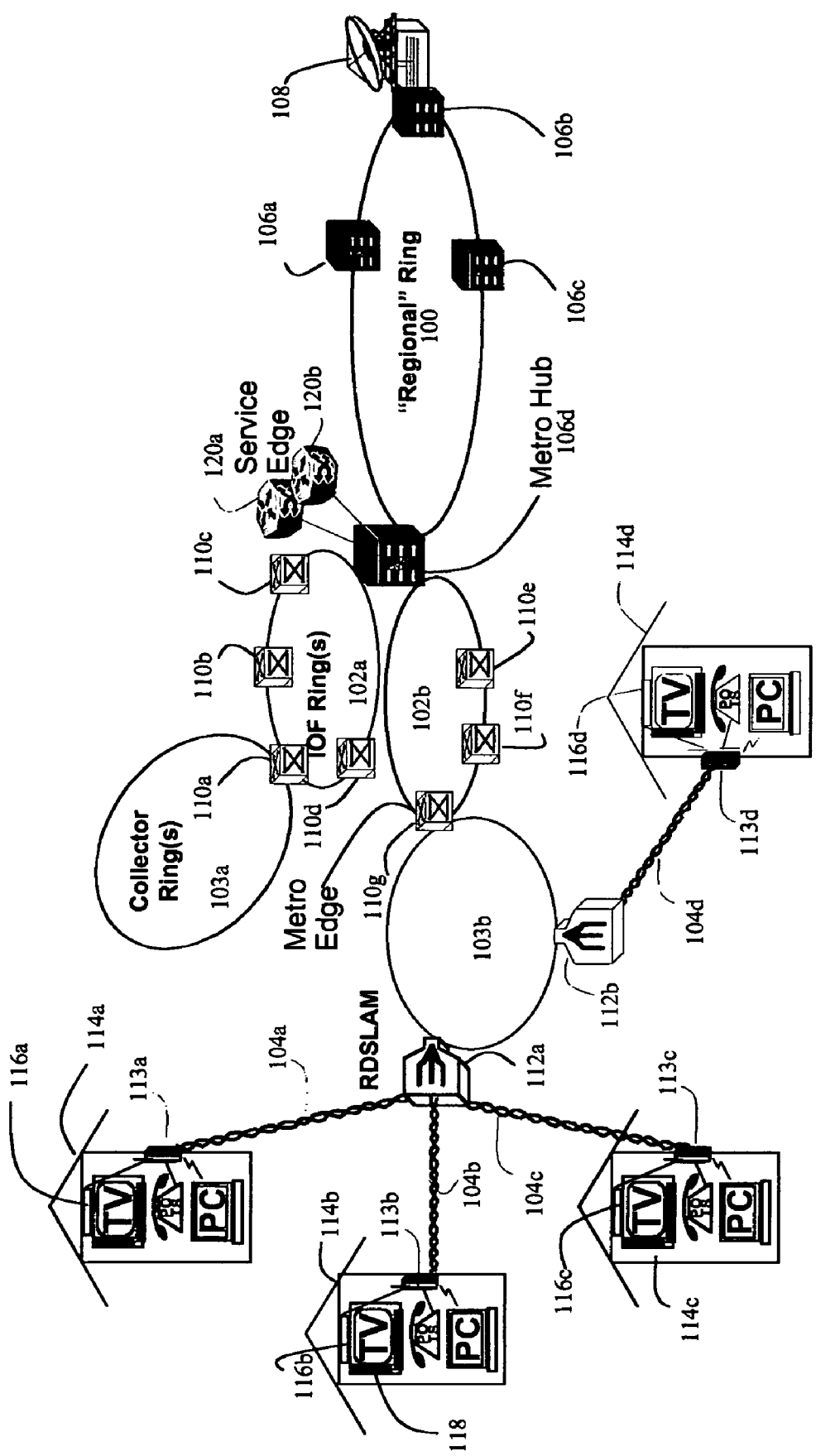
FIG. 1 illustrates a network architecture for delivering IP packet based services to residences

Referring to FIG. 1, a network architecture for delivering IF packet based services to residences includes a regional ring (100), Inter-Office Fibre ("IOF") rings (102a, 102b), collector rings (103a, 103b) and so called "first mile" access networks (104a-104d). The regional ring covers a wide geographic area and feeds metro hubs (106a-106d) at the centers of metropolitan areas. The IOF rings (102) feed metro edge devices (110a-110g) which in turn feed collector rings (103), e.g., at Tier 1 offices. In the illustrated embodiment the access networks include Remote Digital Subscriber Line Access Multiplexors ("RDSLAMs") (112a, 112b), attached to a collector ring and which are in communication with Residential Gateways (113a-113d) of subscribers homes (114a-114d) via Digital Subscriber line ("DSL") loops to each home, but those skilled in the art will recognize that other types of access network might be employed. Residential Gateways communicate with networked devices in the homes, including set top boxes (116a-116d).

Figure 2:
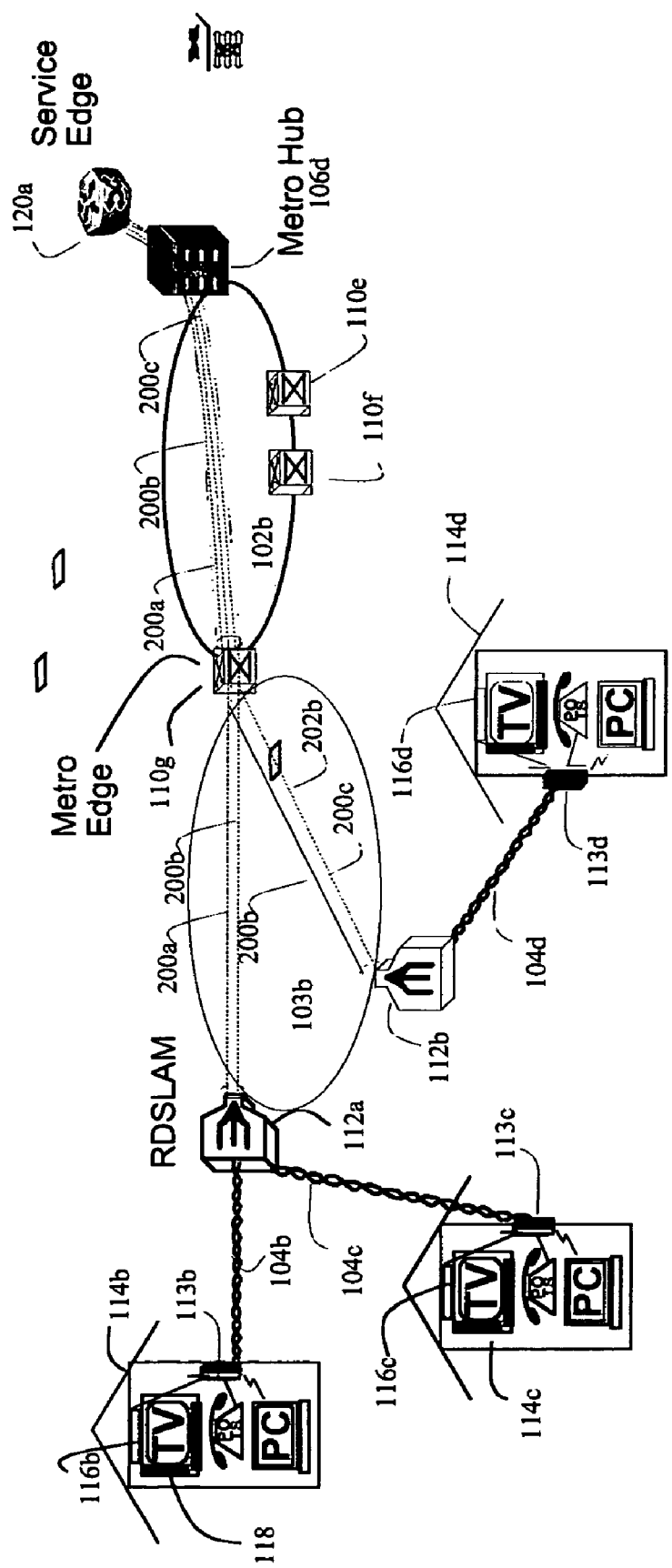
FIG. 2 illustrates the organization of pseudo wires in the architecture of FIG. 1.

The normal method of delivery of IP packet based services is for IP packets to be transported between the residential gateway and a Service Edge node (120a,120b) locally attached to a metro hub. The Service Edge node is responsible for applying subscriber specific policy to the delivery of services and will inspect packets before routing them as may be over the regional ring (100) towards their destination. Return packets are routed to the same Service Edge before being transported across IOF ring (102). With reference to FIG. 2, the IOF rings (102) and the collector rings (103) are operable to support the transport of IP packets as the payload of Pseudo wires (200) inside packet trunks (202). In the illustrated embodiment packet trunks (202a) and (202b) are shown as having been provisioned between RDSLAMs (112a,112b) and a Metro Edge (110g), while packet trunk (202c) is shown as being provisioned between the Metro Edge (110g) and a Service Edge (120a), but those skilled in the art will recognize that other arrangements of packet trunks can be operated to support the realization of Pseudo Wires (200a-200c) between the edges of access networks (112a, 112b) and Service Edge locations (120). As depicted in FIG. 2, there is a Pseudo Wire established for each DSL loop (104) and Residential Gateway (113) for the exclusive transport of packets to and from the associated residence (114), but those skilled in the art will recognize that there may be a plurality of Pseudo Wires established for a residence when packets related to specific IP based services need to be steered to specific Service Edge devices.

Figure 3:
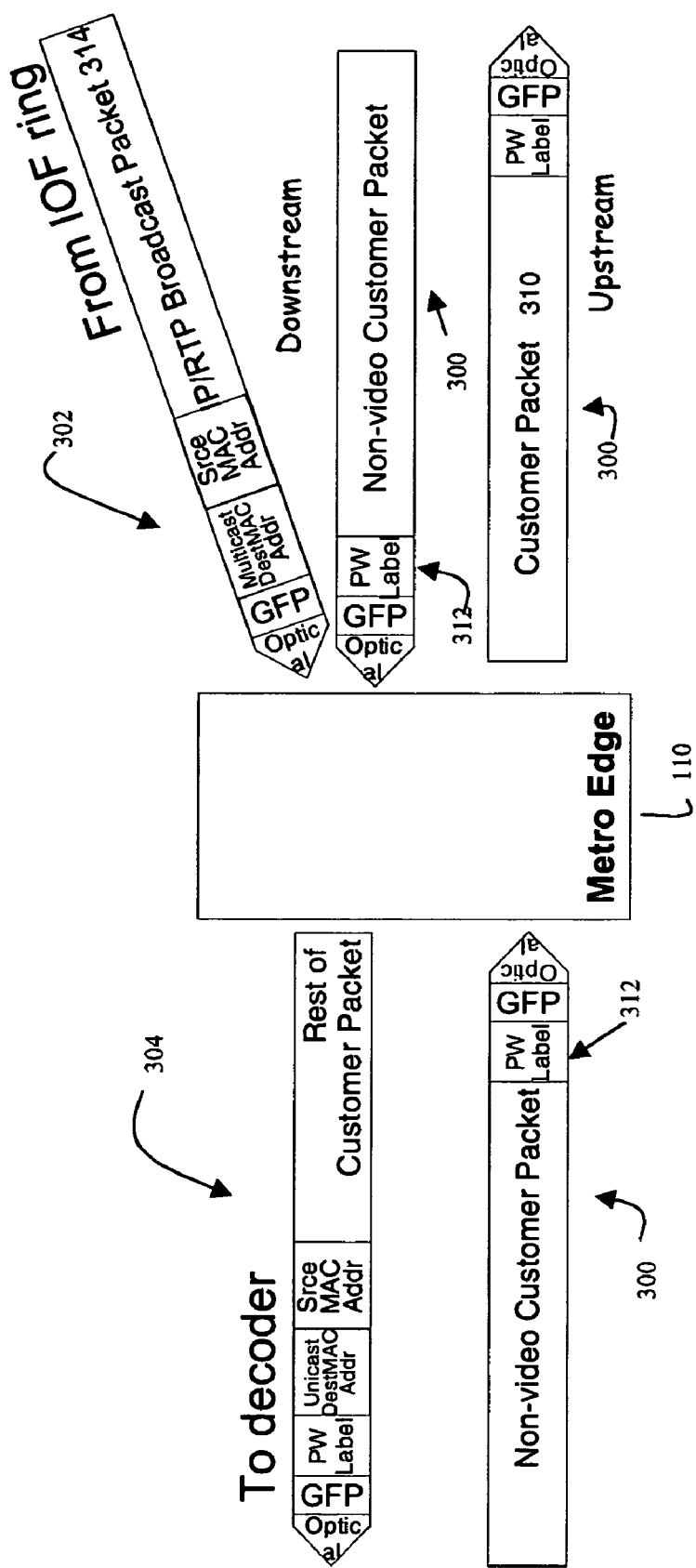
FIG. 3 illustrates packet formats in the pseudo wire merge operation for the architecture of FIG. 2.

Referring to FIGS. 2 and 3 for the normal operation of Pseudo Wires in the upstream direction, a customer packet (310) originated from an end system such as a Set Top Box (116b) is transmitted as an Ethernet packet to Residential Gateway (113b) and from there it is transmitted over DSL Loop (104b) to the Pseudo Wire Ingress node, in this case the RDSLAM (112a). At the Pseudo Wire Ingress node, a Pseudo Wire label is pre-pended to the customer packet and it is encapsulated with the message protocol fields for the packet trunk that transports it towards the Pseudo Wire egress node, the Service Edge (120a). The pseudo wire label serves to identify customer packets as coming from, or destined for, a particular customer location. It may contain a distinct customer ID value. In the illustrated embodiment of FIG. 3 showing the pseudo wire packets traversing an intermediate node, the Metro Edge (110g), the format of the resulting pseudo wire packets (300) is for the case where the packet trunks are realized using SONET Paths with Generic Framing Protocol ("GFP") but those skilled in the art will recognize that there are many forms of pseudo-wire label and many forms of packet trunk. According to the usual usage of Pseudo Wires, customer packets (311) to be transported downstream from the Service Edge (120a) to the Residential Gateway (113b) are converted to Pseudo Wire packets at the Service Edge, and transported in packet trunks to RDSLAM (112b), the Service Edge and the RDSLAM being the ingress node and egress node respectively of the pseudo wire for downstream traffic. Further according to the usual usage of Pseudo Wires the customer packet part (310,311) and the Pseudo Wire label (312) are not altered by intermediate nodes such as the Metro Edge The usage of Pseudo Wires as described in the preceding sections is efficient for uni-cast traffic such as that generated in IP packet based services such as VoIP and Internet Access. However, when it is desired to deliver a Switched Digital Broadcast Service such as IF TV then the aforementioned usage of Pseudo Wires would result in very inefficient use of bandwidth on the IOF ring as the channel change point would have to be at the pseudo wire ingress point, the Service Edge. In large scale deployments having the channel change point at the Service Edge would result in many copies of the same channel's packets being transmitted over the IOF ring, each in a different Pseudo Wire. What is required is a method of Pseudo Wire operation that permits the channel change point to be located at an intermediate node in the Pseudo Wire path. In the illustrated embodiment that intermediate node in the Pseudo Wire path where the channel change operation is carried out is the Metro Edge (110a-110g) but those skilled in the art will recognize that the optimal location of the channel change point is a function of both the number of channels in the IPTV service and the average number of decoders downstream of the channel change point and that a particular realization may have the channel change point at another intermediate node on the Pseudo Wire path.

Referring again to FIG. 1, both the regional ring (100) and the IOF rings (102) are operable to transport the television signals of a signal source (108). In particular, the regional ring and the IOF rings are employed to transport to the Metro Edges (110) the packet streams of all channels offered by the television service provider. In the illustrated embodiment DWDM and SONET technologies are employed for the regional and IOF rings, but those skilled in the art will recognize that other, alternate technologies might be employed. The packet streams of the television channels may all be transported on a single wavelength $\lambda$, depending on the number of channels, the encoding scheme used whether the service is high definition or standard definition, and the bandwidth per wavelength. For example, a 2.4 Gb/s wavelength would be sufficient for an IPTV service of up to 300 High Definition channels when each channel is MPEG4 encoded at 8 Mb/s.

The metro hub device (106d) includes an Optical Add/Drop Multiplexor ("OADM") or other SONET-compatible switching capability to enable drop or drop-and-continue processing of the wavelength having the television signal. Consequently, more than one metro hub can contemporaneously utilize the same television signal carrying wavelength. Further, the metro hub is operable to contemporaneously provide the wavelength $\lambda$ to multiple IOF rings. In the illustrated embodiment the television signal source (108) broadcasts all channels onto the regional ring (100) in a single wavelength $\lambda$ (in both directions for reliability). The metro hub (106d) is operable to drop or drop-and-continue the wavelength $\lambda$, and transmit it in both directions on the IOF ring (102b). Similarly, the metro edge device (110g) drops or drops-and-continues the entire wavelength $\lambda$. It will be recognized by those skilled in the art that there are other methods of delivering to each of the channel change points a copy of the streams of packets for all television channels.

The metro edge device (110g) is operable as a channel change point to selectively copy the packet streams of individual television channels from the broadcast wavelength $\lambda$ for forwarding to individual decoders (116a-116d) associated with subscriber devices. For example, the metro edge device (110g) transmits to a given decoder (116b), a copy of the packet stream of the channel currently selected by a subscriber device (118) associated with that decoder (116b). Further, the packet stream of television signals for the selected channel is delivered by being merged into the same downstream Pseudo-Wire as is established for normal uni-cast traffic to the specific residence e.g., Pseudo-Wire (200a, FIG. 2) to residential gateway (113b) and then to decoder (116b). All of the channels currently selected by subscriber devices associated with a particular RDSLAM (112a) are transmitted via Psuedo-Wires (200a-200b) in the same packet trunk (202a). Consequently, multiple copies of a given video channel may be transported simultaneously in different Pseudo Wires in the same packet trunk downstream of the channel change point.

The merging operation of the Metro Edge can be described by reference to FIG. 3. Typical packets (303) in a downstream pseudo-wire processed by the metro edge (110g) include a Generic Framing Procedure ("GFP") header, a pseudo-wire label and the customer packet (311) itself. Although not shown in FIG. 3 the customer packet (311) includes an Ethernet header and specifically within that header a uni-cast Destination MAC address, this MAC address being the Ethernet address of an End System in the residence served by the pseudo wire. An incoming packet of a IP TV channel (302) arriving from the IOF ring is an IP multicast packet that includes a GFP header, and an Ethernet header that that includes a multicast destination MAC address and a source MAC address, and with a Real-Time Protocol ("RTP") payload. The multicast destination MAC address is derived from the IP multicast group address according to the normal rules of IP multicast operation. The IP multicast group address identifies the particular television channel associated with the broadcast packet. The metro edge performs a pseudo-wire merge by processing the TV channel packets (302) from the IOF ring to produce a stream of packets (304) destined for the customer decoder which is pseudo-wire compliant. One of the operations performed by the metro edge on the packets to be merged is to effect the encapsulation normally done at the pseudo wire ingress. Another operation that may be performed is to change the customer packet from a multicast packet to a uni-cast packet. Both of these operations may be done by a kind of label swap operation: swapping the multicast destination MAC address of the broadcast packet (302) for the pseudo-wire label and unicast destination MAC address where the pseudo-wire label is that of the customer's existing pseudo wire (200) from Service Edge to RDSLAM and the unicast destination MAC address is the address of the decoder (116). Those skilled in the art will recognize that other fields in the packet headers may also be altered, for example to set the priority of the video stream packets. The result is unicast packet (304) that arrives at the RDSLAM indistingushible from other unicast packets that were transmitted on the Pseudo Wire from the Pseudo Wire ingress point, the Service Edge.

Figure 4:
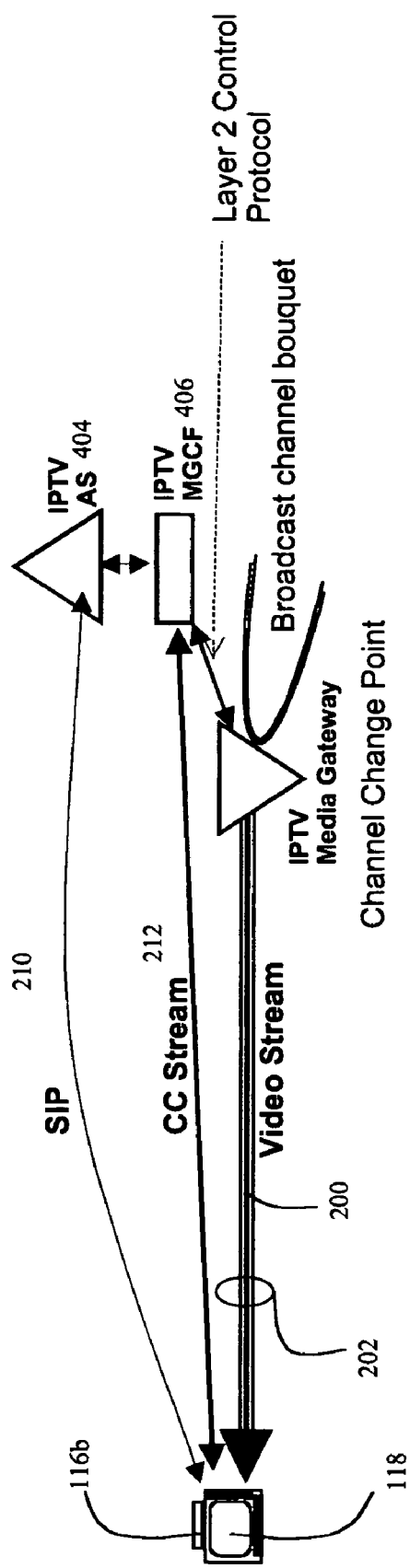
FIG. 4 illustrates control signaling for the architecture of FIG. 2.

Referring now to FIG. 4, it is desirable that the processing of user channel change requests be executed at the application layer so that subscriber policy and security may be applied. Because the typical metro edge device is not designed to support application layer channel changes and similar operations, an IPTV Application Server ("AS") (404) and an IPTV Media Gateway Control Function ("MGCF") (406) are employed to support IPTV service initiation and termination and channel change control. From the perspective of these network elements, the channel change point, the metro edge (110g, FIG. 1), is considered to be an IPTV media gateway (408). The AS and MGCF may be integrated into the metro edge or more likely be placed in communication with the metro edge and located at or beyond the Service Edge (120a, FIG. 2) and Metro Hub (106d) location. The decoder (116b) may initiate a session with the IPTV application server (204) by signalling via Session Initiation Protocol ("SIP") (210). As discussed above, the decoder could be a Set-top box, PC or Digital TV. Session initiation results in assignment of resources for media stream delivery, i.e., one way from media gateway/server to decoder plus permissions for a two-way media command & control ("CC") stream (212) between the decoder (116b) and the MGCF (206). Based upon user commands (CCP messages) in the CC stream (212), the MGCF (206) applies any policies on channel selection for that user and then computes the broadcast address of the new channel and the pseudo wire label and unicast destination address needed by the metro edge to merge the packets of the new channel into the pseudo wire serving the user. These fields are then conveyed to the IPTV media gateway, namely the metro edge, using some form of layer 2 control protocol. Upon receipt of the new fields, the metro edge simply performs the described header swap processing on the broadcast packets associated with the new television channel as indicated by the multicast destination address, and ceases such processing on the broadcast packets associated with the old television channel.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Further while the above exemplary embodiment relate to application of IPTV one skilled in the art will recognize that the invention may be employed in any situation where it is more efficient to merge some first packet stream at an intermediate point in the path of another second packet stream than to transport the first packet stream over the whole path of the second packet stream, for example when frequently viewed video on demand content is cached at the metro edge. Accordingly, the invention should not be viewed as limited except by the scope and spirit of the appended claims.

What is claimed is:

1. A method for delivering two streams of packets, the method comprising:
   receiving, at an intermediate node in a network, a first stream of packets within a pseudo wire which provides a point-to-point connection service for delivering received packets unchanged and without reordering, the pseudo wire being used to transmit packets of the first stream from an ingress node to an egress node;
   obtaining, at the intermediate node, a second stream of packets that are not within the pseudo wire;
   modifying headers of the second stream of packets in such manner that downstream nodes will forward the packets in identical fashion to those of the first stream within the pseudo wire;
   merging the modified packets of the second stream with the packets of the first stream; and
   transmitting the merged packets towards the egress node via the pseudo wire.

2. The method of claim 1 employed for delivering a television service to a plurality of subscriber's residences, and further comprising the steps of:
   receiving a single stream of a television broadcast from a source at the intermediate node in the network, the broadcast having multiple channels which are transmitted in multicast packets;
   replicating and merging selected ones of the received multicast packets which contain data of selected television channels into pseudo wires; and
   transmitting the selected packets via the pseudo-wires to the respective subscribers' residences.

3. The method of claim 2 wherein the merging step includes the further step of inserting fields in a header portion of the selected ones of the received multicast packets.

4. The method of claim 3 wherein the fields inserted include the packet transport headers for the packet switched network or packet trunk that transports the pseudo wire towards the subscriber, and a form of pseudo wire label, where the pseudo wire label has the same value as that used by the network to identify and encapsulate a particular subscriber's uni-cast traffic.

5. The method of claim 4 wherein the pseudo wire label has the format and semantics of a pseudo-wire label as defined by the IETF Pseudo-Wire End to End Emulation Working Group.

6. The method of claim 4 wherein the pseudo wire label has the format and semantics of a Service VLAN ID ("S-VID") as defined by the IEEE 802.1 ad, Provider Bridge Network group.

7. The method of claim 4 wherein the pseudo wire label has the format and semantics of an Extended Service Tag or I-TAG as defined by the IEEE 802.1ah, Provider Backbone Bridge Network ("PBB") group.

8. The method of claim 4 wherein the merging step includes the further step of swapping fields in a header portion of the selected ones of the received multicast packets.

9. The method of claim 8 further including swapping a multicast destination MAC address of the received multicast packet for a unicast destination MAC address where the unicast destination MAC address is the address of a device at the subscriber's residence.

10. The method of claim 2 including the further step of, in response to signaling from the subscriber's residence, selecting different ones of the received multicast packets which contain data of a newly selected television channel for merging into the pseudo wire.

11. The method of claim 6 wherein a signaling from the subscriber's residence includes an indication of the MAC address associated with the decoder device in the residence that is to receive the channel.

12. A network architecture for delivering two streams of packets, the network architecture comprising:
- an intermediate node including physical memory, processing hardware and an interface configured to receive a first stream of packets within a pseudo wire which provides a point-to-point connection service for delivering received packets unchanged and without reordering, the pseudo wire being used to transmit packets of this first stream from an ingress node to an egress node, the intermediate node being further configured to obtain a second stream of packets that are not within the pseudo wire;
- processing logic of the processing hardware configured to:
- modify the headers of the second stream of packets in such manner that downstream nodes will forward the packets in identical fashion to those of the first stream within the pseudo wire; and
- merge the modified packets of the second stream with the packets of the first stream; and
- transmission logic of the processing hardware configured to transmit the merged packets towards the egress node via the pseudo wire.

13. The network architecture of claim 12 employed for delivering a television service to a plurality of subscriber residences from a source, and further wherein:
- the intermediate node is configured to receive a single stream of a television broadcast from the source, the broadcast having multiple channels which are transmitted in multicast packets, the intermediate node being further configured to replicate and merge selected ones of the received multicast packets which contain data of particular selected television channels into a pseudo-wire, and unicast-transmit the selected packets via the pseudo-wire to decoders at the respective subscriber residences.

14. The network architecture of claim 13 further including the intermediate node operable in conjunction with a channel change control function that informs the intermediate node which of the multicast packets to select and the values of the fields to be inserted in a header portion of the selected multicast packets.

15. The network architecture of claim 14 wherein the fields inserted include the packet transport headers for the packet switched network or packet trunk that transports the pseudo wire towards the subscriber, and a form of pseudo wire label, where the pseudo wire label has the same value as that used by the network to identify and encapsulate a particular subscriber's uni-cast traffic.

* * * * *